UNITED STATES PATENT OFFICE.

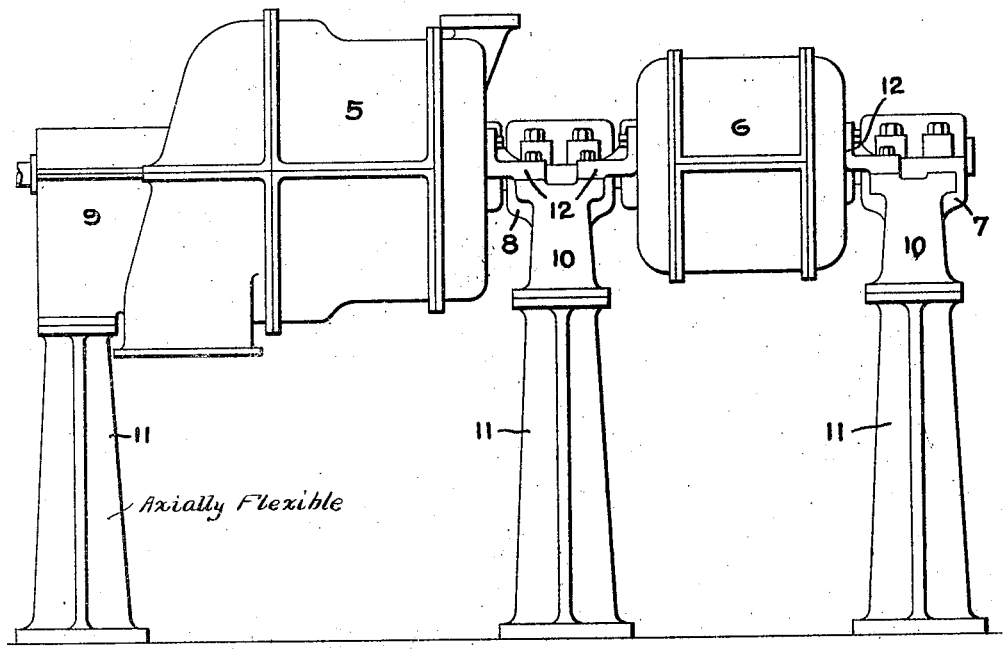

OSCAR JUNGGREN, OF SCHENECTADY, NEW YORK, ASSIGNOR TO GENERAL ELECTRIC COMPANY, A CORPORATION OF NEW YORK

SUPPORTING MEANS FOR TURBINE-DRIVEN UNITS AND THE LIKE.

1,369,637.

Specification of Letters Patent.   Patented Feb. 22, 1921.

Application filed May 27, 1919. Serial No. 300,214.

*To all whom it may concern:*

Be it known that I, OSCAR JUNGGREN, a citizen of the United States, residing at Schenectady, county of Schenectady, State of New York, have invented certain new and useful Improvements in Supporting Means for Turbine-Driven Units and the like, of which the following is a specification.

The present invention relates to supporting means for machine installations where the machine or machines become heated during operation and expand thus effecting a movement on their foundations.

The object of my invention is to provide an improved supporting means or supporting arrangement for such machines, and for a consideration of what I believe to be novel and my invention, attention is directed to the accompanying specification and the claims appended thereto.

In the present instance, I have illustrated my invention in connection with a turbine driven set wherein the turbine shaft is coupled directly to a second apparatus such as a generator, gearing or the like, but it will be understood, of course, that this is only by way of example and that the invention is not limited thereto.

In the drawing, the figure is a side elevation in outline of an installation embodying my invention.

Referring to the drawing, 5 indicates a turbine and 6 some driven apparatus such as a gearing or a generator having its shaft directly coupled to the turbine shaft. Bearings for these shafts are indicated at 7, 8 and 9.

Now, according to my invention, I support the turbine casing and the casing of the driven apparatus by means of lugs which are formed integral with or are suitably fastened to such casings and which rest on the bearing standards, the bearing standards in turn being supported on the ends of vertical beams which have a certain amount of flexibility in a direction parallel to the shafts. By this arrangement when the casings expand and contract the beams will flex sufficiently to permit the movements due to expansion and contraction to take place.

In the drawing, 10 indicates the bearing standards, 11 the flexible beams on the ends of which the standards rest, and 12 the lugs here shown in the form of angle irons which support the casings on the bearing standards. The beams 11 may be I-beams or of other suitable type and will be of such stiffness, compared to their length, as to give the desired degree of flexibility.

One application of my invention is for supporting turbine driven units in ships, the lower ends of the beams being supported on the bottom of the ship, and I consider this as being an important application of my invention, for it then not only permits of expansion and contraction taking place, but prevents to a considerable extent disturbances in the hull of the ship from being transferred to the turbine set.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In combination, a machine installation, the parts of which are subjected to changes in temperature causing them to expand and contract, and beams flexible in a direction parallel to said installation but rigid transversely upon the ends of which said parts are supported, whereby said beams may flex to permit axial expansion and contraction of the installation.

2. In combination, a set comprising a turbine and a driven machine having their shafts coupled together, bearings for said shafts, standards for said bearings, means supporting said turbine and driven machine on said standards, and beams flexible in a direction parallel to said shafts but rigid transversely upon the ends of which said standards are supported, whereby said beams may flex to permit axial expansion and contraction of the installation.

3. In combination, a set comprising a turbine and a driven machine having their shafts coupled together, bearings for said shafts, standards for said bearings, lugs carried by the casings of said turbine and driven machine and resting on said standards for supporting said turbines and driven machine, and beams flexible in a direction parallel to said shafts but rigid transversely upon the ends of which said standards are supported, whereby said beams may flex to permit axial expansion and contraction of the installation.

4. In combination, a set comprising a turbine and a driven machine having their shafts coupled together, bearings for said shafts, standards for said bearings, angle irons connected to the casings of said turbine and driven machine and resting on said standards for supporting said turbine and driven machine, and beams flexible in a direction parallel to said shafts but rigid transversely upon the ends of which said standards are supported, whereby said beams may flex to permit axial expansion and contraction of the installation.

In witness whereof, I have hereunto set my hand this 26th day of May, 1919.

OSCAR JUNGGREN.